(12) United States Patent
Parkvall et al.

(10) Patent No.: US 8,861,471 B2
(45) Date of Patent: *Oct. 14, 2014

(54) SIGNALLING RESOURCE ALLOCATION IN A TELECOMMUNICATIONS NETWORK

(71) Applicant: Telefonaktiebolaget L M Ericsson (publ), Stockholm (SE)

(72) Inventors: Stefan Parkvall, Stockholm (SE); Erik Dahlman, Bromma (SE); Ylva Jading, Stockholm (SE); Bengt Lindoff, Bjarred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 151 days.

This patent is subject to a terminal disclaimer.

(21) Appl. No.: 13/729,178

(22) Filed: Dec. 28, 2012

(65) Prior Publication Data

US 2013/0176959 A1 Jul. 11, 2013

Related U.S. Application Data

(63) Continuation of application No. 12/999,430, filed as application No. PCT/SE2008/051432 on Dec. 10, 2008, now Pat. No. 8,379,587.

(60) Provisional application No. 61/073,802, filed on Jun. 19, 2008.

(51) Int. Cl.
*H04W 4/00* (2009.01)
*H04W 72/04* (2009.01)
*H04L 5/00* (2006.01)
*H04W 72/00* (2009.01)
*H04W 28/06* (2009.01)
*H04L 27/26* (2006.01)
*H04W 88/08* (2009.01)
*H04W 28/16* (2009.01)

(52) U.S. Cl.
CPC .............. *H04W 72/04* (2013.01); *H04W 28/06* (2013.01); *H04W 72/042* (2013.01); *H04L 27/2602* (2013.01); *H04L 5/0094* (2013.01); *H04W 88/08* (2013.01); *H04L 5/0044* (2013.01); *H04W 28/16* (2013.01)
USPC ........................................ 370/329; 455/450

(58) Field of Classification Search
CPC ....................................................... H04W 4/00
USPC ............................................................ 370/329
See application file for complete search history.

(56) References Cited

U.S. PATENT DOCUMENTS

| 8,059,594 | B2 | 11/2011 | Cho et al. | |
|---|---|---|---|---|
| 8,280,386 | B2 * | 10/2012 | Oh et al. | 455/447 |
| 2012/0269157 | A1 * | 10/2012 | Arnott et al. | 370/329 |
| 2013/0301576 | A1 * | 11/2013 | Miki et al. | 370/329 |

FOREIGN PATENT DOCUMENTS

GB 2436416 A 9/2007

OTHER PUBLICATIONS

Yin, H. et al., "16m Resource Block Indexing Schemes Evaluation," IEEE 802.16 Broadband Wireless Access Working Group, Mar. 2008, Available online at: http://www.ieee802.org/16/tgm/contrib/C80216m-08_218r1, ppt#268,1,Slide 1.

* cited by examiner

Primary Examiner — Huy C Ho
(74) Attorney, Agent, or Firm — Coats & Bennett, PLLC (57) ABSTRACT

The present invention provides a method, a radio base station and a mobile terminal for allocating resources in a telecommunications network, where communications between the radio base station and the mobile terminal take place over a plurality of carriers. The method comprises transmitting and receiving a resource allocation message comprising one or more bits. Each of the bits corresponds to a number of resource blocks, where the number is determined from the ratio of the aggregate bandwidth of the plurality of carriers divided by the bandwidth of the carrier over which the resource allocation message is sent.

28 Claims, 6 Drawing Sheets

SIGNALLING RESOURCE ALLOCATION IN A TELECOMMUNICATIONS NETWORK

RELATED APPLICATIONS

This application is a continuation of U.S. patent application Ser. No. 12/999,430 filed Dec. 16, 2010, which was a U.S. National Stage application of International Patent App. No. PCT/SE2008/051432 filed Dec. 10, 2008, which in turn claimed priority from U.S. Provisional App. No. 61/073,802 filed Jun. 19, 2008, and this application claims priority to and expressly incorporates herein by reference in their entirety all such applications.

TECHNICAL FIELD

The present invention relates to methods in a telecommunications network, and in particular relates to methods, radio base stations, and mobile terminals for signalling resource allocation for communications between a radio base station and a mobile terminal.

BACKGROUND

Figure 1:
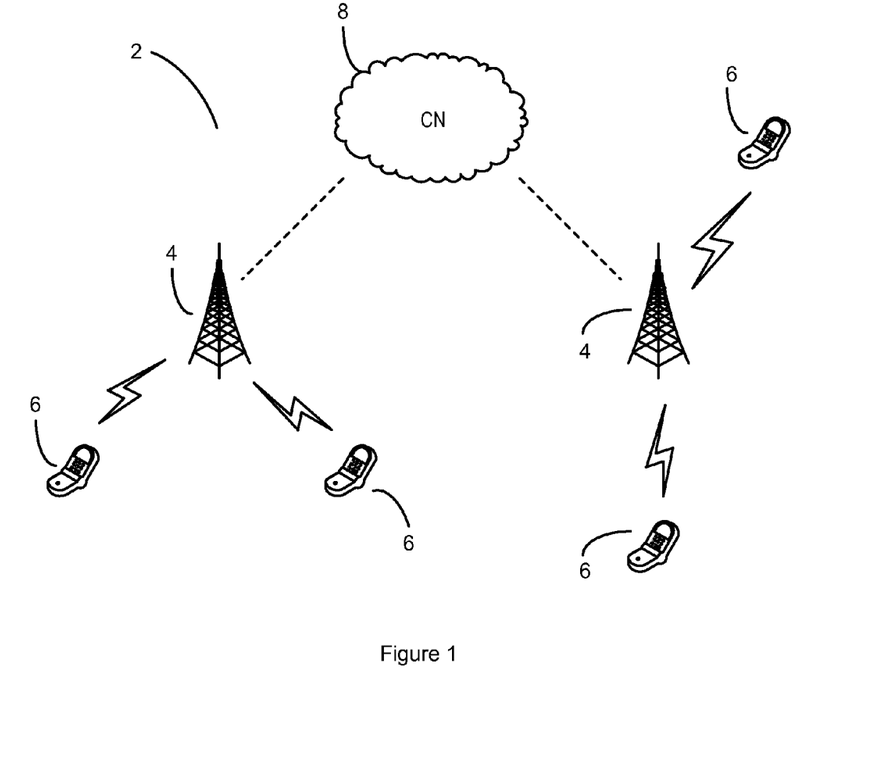
FIG. 1 shows a telecommunications network.

FIG. 1 shows a telecommunications network 2. The network 2 comprises a plurality of radio base stations 4, each of which communicates with a plurality of mobile terminals 6 in so-called "cells". Each radio base station 4 further communicates with a core network 8. For example, where the network 2 is an evolved UMTS terrestrial radio access network (E-UTRAN), the core network 8 comprises an evolved packet core, itself comprising a mobility management entity (MME), a serving gateway and a PDN (packet data network) gateway.

E-UTRAN according to Release 8 of the 3GPP specifications supports bandwidths up to 20 MHz. However, one of the requirements of future releases of this standard is expected to be the support of bandwidths larger than 20 MHz. A further important requirement on such releases is to assure backward compatibility with Release 8. This should also include spectrum compatibility. That would imply that a future-release carrier, wider than 20 MHz, should appear as a number of Rel-8 carriers to a Rel-8 terminal. Each such carrier can be referred to as a Component Carrier. In particular for early deployments of future releases, it can be expected that there will be a smaller number of future-release terminals compared to many legacy Rel-8 terminals. Therefore, it is necessary to assure an efficient use of a wide carrier also for legacy terminals, i.e. that it is possible to implement carriers where legacy terminals can be scheduled in all parts of the wideband future-release carrier.

Figure 2:
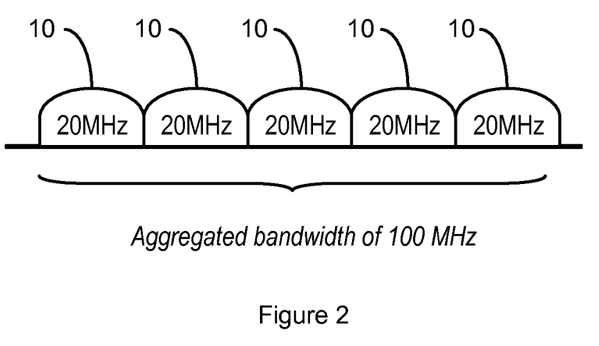
FIG. 2 shows a plurality of aggregated component carriers.

The straightforward way to obtain this would be by means of carrier aggregation. Carrier aggregation implies that a future-release terminal can receive multiple component carriers, where the component carriers have, or at least have the possibility of having, the same structure as a Rel-8 carrier. Carrier aggregation is illustrated in FIG. 2 where five component carriers 10, each of 20 MHz bandwidth, have been aggregated together to form an aggregated bandwidth of 100 MHz.

In 3GPP Release 8, downlink control signalling is used to support transmission of uplink and downlink data. Release 8 uses downlink L1/L2 control signalling. The downlink L1/L2 control signalling includes downlink scheduling assignments including information required for the terminal to be able to properly receive downlink data transmissions and uplink scheduling grants controlling the uplink transmission activity.

The downlink L1/L2 control signalling corresponds to three different physical-channel types:

The Physical Control Format Indicator Channel (PCFICH), informing the terminal about the size of the control region (one, two, or three OFDM symbols). There is one and only one PCFICH in each cell.

The Physical Downlink Control Channel (PDCCH), used to signal downlink scheduling assignments and uplink scheduling grants. Each PDCCH carries signalling for a single terminal (or a group of terminals). There are typically multiple PDCCHs in each cell.

The Physical Hybrid-ARQ Indicator Channel (PHICH), used to signal hybrid-ARQ acknowledgements in response to uplink UL-SCH transmissions. There are multiple PHICHs in each cell.

Part of the information transmitted on a PDCCH is the resources used for transmission of the data, expressed as resource blocks. That is, each resource block relates to a particular portion of frequency bandwidth, and a particular interval in time. There are three different possibilities to signal the resource-block allocation type: type 0, 1 and 2. Resource-block allocation types 0 and 1 both support allocations of non-contiguous resource blocks in the frequency domain, while type 2 supports allocations of contiguous resource blocks only.

Figure 3:
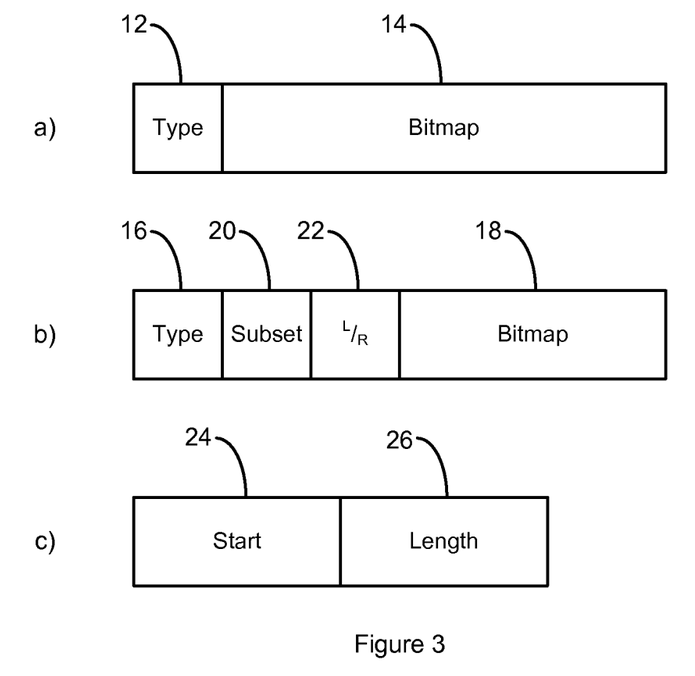
FIGS. 3a to 3c show the structure of resource allocation messages for resource allocation types 0, 1 and 2, respectively.

FIGS. 3a to 3c illustrate the format of the three resource-block allocation message types 0, 1 and 2 respectively.

In resource allocation type 0 (FIG. 3a), an allocation message comprises a type identifier 12 (i.e. identifying resource allocation type 0) and a bit map 14 pointing to resource blocks that are allocated. The size of the bit map is reduced by each bit pointing not to individual resource blocks in the frequency domain, but to groups of a fixed number of contiguous resource blocks. The size of such a group is determined by the downlink cell bandwidth; for the smallest bandwidths there is only a single resource block in a set implying that an arbitrary set of resource blocks can be scheduled, while for the largest cell bandwidths groups of four resource blocks may be used. Thus, the bitmap for a system with a downlink cell bandwidth of 100 resource blocks may be reduced from 100 bits to 25 bits. A drawback though is that the scheduling granularity is reduced; single resource blocks cannot be scheduled for the largest cell bandwidths using allocation type 0.

This is a problem, as in large cell bandwidths a frequency resolution of a single resource block is sometimes useful, e.g. to support small payloads. Resource allocation type 1 addresses this by dividing the total number of resource blocks in the frequency domain into dispersed subsets. The number of subsets is given from the cell bandwidth, with the number of subsets in type 1 being equal to the group size in type 0.

Thus, for the example of a downlink cell bandwidth of 100 resource blocks, as described above, there are four subsets. Within a subset, a bitmap indicates the resource blocks in the frequency domain upon which the downlink transmission occurs.

FIG. 3b shows the resource allocation message structure for resource allocation type 1. The message again comprises a type identifier 16 (identifying type 1) and a bitmap 18 identifying the resource blocks that are allocated. However, one of the requirements on the design of resource allocation type 1 was to maintain the same number of bits in the allocation message as for type 0, without adding unnecessary overhead. The bitmap 18 in resource allocation type 1 is therefore necessarily smaller than in type 0 to allow for the signalling of the subset number in the subset identifier field 20. A consequence of the smaller bitmap 18 is that not all resource blocks in the subset can be addressed simultaneously. To be able to address all resources with the bitmap, there is a flag 22 indicating whether the bitmap relates to the "left" or "right" part of the resource blocks in the subset. That is, further subsets are defined within the original subset.

FIG. 3c shows the structure of a resource allocation message for resource allocation type 2. Unlike the other two types of resource-block allocation signalling, type 2 does not rely on a bitmap. Instead, it encodes the resource allocation as a start position 24 and length 26 of the resource-block allocation. Thus, it does not support arbitrary allocations of resource blocks but only contiguous allocations, thereby reducing the number of bits required for signalling the resource-block allocation.

What is required is a way of signalling resource allocation in a telecommunications network utilizing a plurality of carriers between the radio base station and the mobile terminal.

Two alternatives for L1/L2 control signalling in future releases of the UTRAN as specified in future releases of the 3GPP specifications can be considered (i.e. when signalling on multiple component carriers):

Each component carrier has its own PDCCH; if the terminal is scheduled on multiple component carriers, information about that particular component carrier is included on the PDCCH of the same component carrier.

PDCCHs on one component carrier can point to resource blocks on multiple component carriers.

In the first alternative, the signalling structure on each component carrier can be identical to Rel-8. However, in the second alternative, one PDCCH needs to be able to point to resource blocks on multiple component carriers. Such a PDCCH therefore needs to be able to point to a larger number of resource blocks than are available on a single component carrier.

Extending the addressing capability in terms of resource blocks can be done by introducing new formats of the control information transmitted on the PDCCH. To be able to allocate resources on all component carriers, the new format needs to be able to address a larger set of resource blocks. As an example, if five carriers of 20 MHz are aggregated, the new format needs to address up to 5×100=500 resource blocks in the frequency domain, compared to 100 in the case of a single 20 MHz carrier only. Hence, the new format will be larger, in terms of the number of bits for control signalling, in order to address the larger number of resource blocks.

However, introducing new formats would require a terminal to monitor multiple formats. This increases the complexity of the terminal as the terminal preferably should monitor also the formats present in Rel-8. If the terminal monitors only the new format(s), the network would be forced to use the new format also for small resource block allocations, resulting in an increase in overhead.

SUMMARY

According to the present invention, the existing control signalling is allowed to indicate a larger set of resource blocks than in Rel-8, where the size of such a set is scaled by the ratio of the total bandwidth over all aggregated component carriers divided by the component carrier carrying the PDCCH.

Thus, according to the present invention there is provided a radio base station for use in a telecommunications network. The radio base station is configured to transmit data to a mobile terminal of the telecommunications network over a plurality of carriers, resources on each of the plurality of carriers comprising respective pluralities of resource blocks. The radio base station comprises: processing circuitry, configured to generate a resource allocation message comprising one or more bits, each bit corresponding to a number of resource blocks; and a transmitter, configured to transmit the resource allocation message over one carrier of the plurality of carriers. The number of resource blocks is determined from the ratio of the aggregate bandwidth of the plurality of carriers divided by the bandwidth of the carrier over which the resource allocation message is transmitted.

A corresponding method is also provided.

According to a further aspect of the present invention, there is provided a mobile terminal for use in a telecommunications network. The mobile terminal is configured to receive data from a radio base station of the telecommunications network over a plurality of carriers, resources on each of the plurality of carriers comprising respective pluralities of resource blocks. The mobile terminal comprises: a receiver, configured to receive a resource allocation message over one carrier of the plurality of carriers, said resource allocation message comprising one or more bits, each bit corresponding to a number of resource blocks; and processing circuitry, configured to decode said resource allocation message. The number of resource blocks is determined from the ratio of the aggregate bandwidth of the plurality of carriers divided by the bandwidth of the carrier over which the resource allocation message is transmitted.

According to the solution proposed by the present invention, only one resource allocation message is therefore required to allocate resources on more than one carrier, minimizing the power spent in transmitting such messages

BRIEF DESCRIPTION OF THE DRAWINGS

For a better understanding of the present invention, and to show more clearly how it may be carried into effect, reference will now be made, by way of example only, to the accompanying drawings, in which.

DETAILED DESCRIPTION

In accordance with the present invention, methods are disclosed for use with the network as described with respect to FIG. 1.

Figure 4:
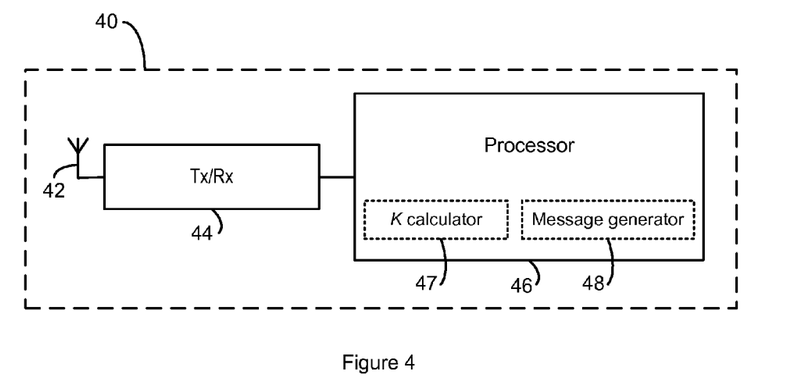
FIG. 4 shows a radio base station according to the present invention.

FIG. 4 shows a radio base station 40 according to the present invention.

The base station 40 comprises an antenna 42, coupled to transmitting and receiving circuitry 44. The Tx/Rx circuitry 44 is further coupled to processing circuitry 46.

It will be apparent to those skilled in the art that, where they are non-essential to describe the present invention, numerous features have been omitted for clarity. Further, it will also be apparent that the base station 40 may comprise more than one antenna, and more than one Tx/Rx circuitry. All such variations are within the scope of the present invention as defined by the claims appended hereto.

The processing circuitry 46 comprises a K calculator 47 which calculates a value for a parameter K as will be described in greater detail below. The processing circuitry further comprises a message generator 48 which operates to generate a resource allocation message as will be described below. The Tx/Rx circuitry 44 and the antenna 42 operate to transmit the resource allocation message, for example, to a mobile terminal or user equipment. Transmission of the resource allocation message takes place over one or more component carriers of a plurality of component carriers. For example, the resource allocation message could be transmitted over one carrier, with the message allocating resources for each of the plurality of carriers. Alternatively, where there are four component carriers, say, resource allocation messages could be transmitted over two of the carriers, with each message allocating resources for two carriers.

In an embodiment where the radio base station 40 is a base station in an E-UTRAN as defined in specifications of the 3GPP, the resource allocation messages may be transmitted over the PDCCH.

Figure 5:
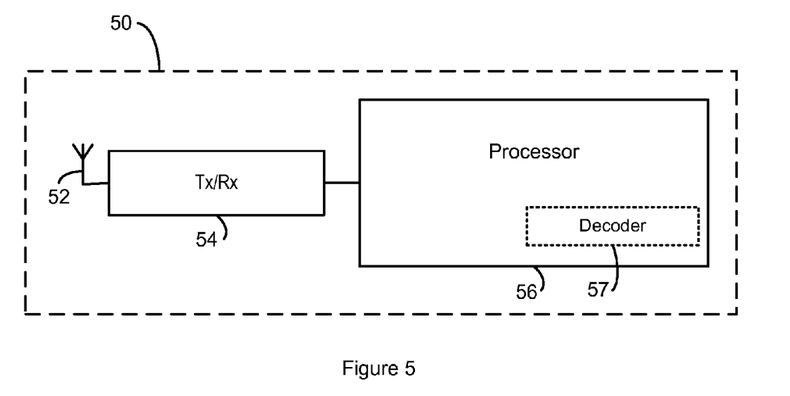
FIG. 5 shows a mobile terminal according to the present invention.

FIG. 5 shows a mobile terminal, or user equipment, 50 according to the present invention.

The mobile terminal 50 comprises an antenna 52, coupled to transmitting and receiving circuitry 54. The Tx/Rx circuitry 54 is further coupled to processing circuitry 56.

It will be apparent to those skilled in the art that, where they are non-essential to describe the present invention, numerous features have been omitted for clarity. Further, it will also be apparent that the mobile terminal 50 may comprise more than one antenna, and more than one Tx/Rx circuitry. All such variations are within the scope of the present invention as defined by the claims appended hereto.

In use, the Tx/Rx circuitry 54 and the antenna 52 operate to receive a resource allocation message. Reception of the resource allocation message takes place over one or more component carriers of a plurality of component carriers. For example, the resource allocation message could be transmitted over one carrier, with the message allocating resources for each of the plurality of carriers. Alternatively, where there are four component carriers, say, resource allocation messages could be transmitted over two of the carriers, with each message allocating resources for two carriers. The processing circuitry 56 comprises a decoder 58 which operates to decode the resource allocation message and to interpret its contents as described in greater detail below.

In an embodiment where the mobile terminal 50 is a mobile terminal in an E-UTRAN as defined in specifications of the 3GPP, the resource allocation messages may be transmitted over the PDCCH.

In accordance with embodiments of the present invention, resource allocation messages are transmitted generally having the same format as disclosed with respect to FIGS. 3a to 3c. However, the messages are scaled to represent a greater number of bits such that resources on a plurality of carriers can be allocated with a single message.

Let $$K = \frac{\sum_i BandwidthofComponentCarrier_i}{BandwidthofAnchorCarrier}$$

where the bandwidth may be expressed in any convenient units, such as resource blocks for example. The anchor carrier is the carrier on which the resource allocation messages are transmitted; and the sum in the numerator part of the equation is over all component carriers for which the message is allocating resources. Thus, the sum may be over all component carriers, or over a subset of two or more of the component carriers.

For example, if there are six allocated carriers, each with a bandwidth of 20 MHz, and resource allocation messages are transmitted over just one of the carriers, K=6. If resources are allocated on just two carriers, K=2. Alternatively, resource allocation messages may be transmitted over two carriers, with messages on each carrier allocating resources on three of the carriers. In this case, K=3 for each resource allocation message. However, there is no requirement that each message be responsible for allocating resources on equal numbers of carriers.

As described above, the resource-allocation messages (type 0, 1, 2) point to resource bocks or to groups of resource blocks. Denote such a (group of) resource blocks by $P_i$, where the number of resource blocks in a group $P_i$ is given by the Rel-8 specifications based on the bandwidth of the anchor carrier.

In the present invention, the resource-allocation messages point not to a set of $P_i$ resource blocks, but to sets $S_i$ where a set $S_i$ contains a number of $P_i$ groups. The number of groups is determined from K. For example, where the resource-allocation type previously pointed to a single resource block, the number of resource blocks pointed to by a resource-allocation type according to the present invention is equal to K. Where the resource-allocation type previously pointed to 4 resource blocks, the number of resource blocks pointed to by a resource-allocation type according to the present invention is 4K.

If K is not an integer, an appropriate rounding function may be used, e.g., rounding up or down, or to the nearest integer. Also, note that one or more of the sets $S_j$ may be of slightly different size so as to match the total number of resource blocks available for transmission.

Figure 6:
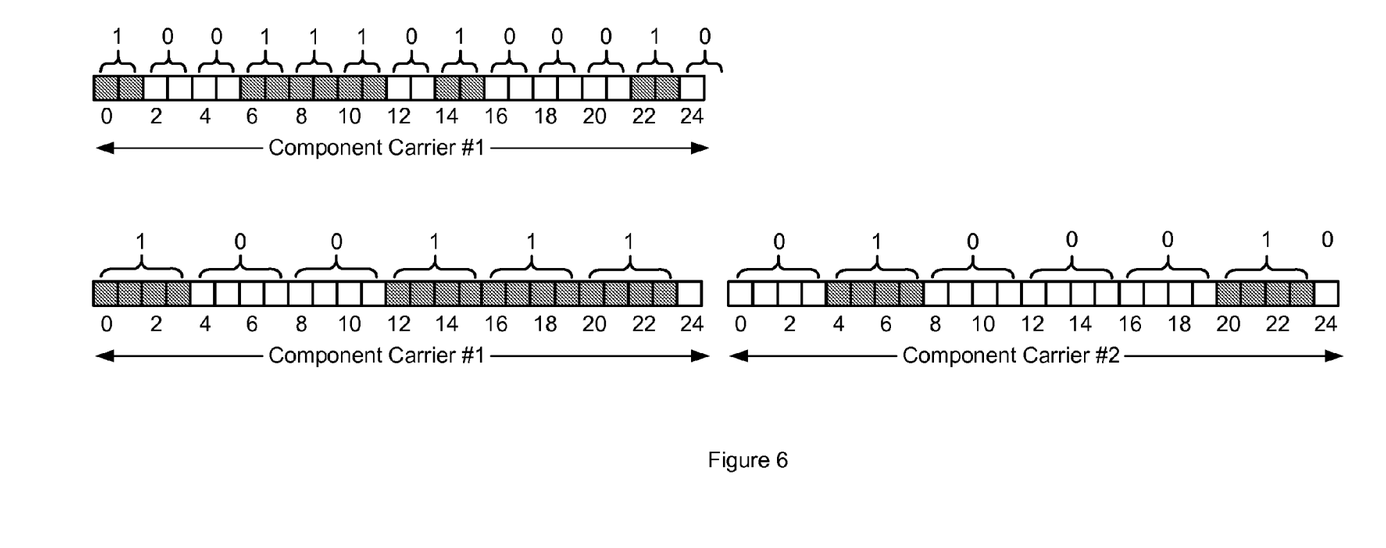
FIG. 6 is a diagram showing allocated resource blocks according to an embodiment of the present invention.

FIG. 6 shows the allocation of resource blocks according to an embodiment of the present invention.

The upper part of FIG. 6 illustrates the allocation of resources when a single component carrier of 25 resource blocks is scheduled, using resource allocation type 0. A 13-bit bitmap points to the 25 resource blocks that are scheduled, with the majority of bits pointing to two resource blocks, and the final bit pointing to a single resource block.

The lower part of FIG. 6 illustrates the allocation of resources according to an embodiment of the present invention, in the example where two component carriers, each of 25 resource blocks, are scheduled. The resource allocation message, using resource allocation type 0, is sent over just one of the two component carriers.

Therefore, in this example, K=2. Again, a 13-bit bitmap points to the resource blocks that are allocated. However, according to this embodiment, each bit points to four resource blocks (i.e. 2K). The same resource allocation message format may therefore be used to allocate resources on more than one component carrier.

In the example shown in FIG. 6, the numbering of resource blocks is separate on each component carrier. Thus, a "new" bit points to the beginning of each component carrier. Leftover resource blocks at the end of each component carrier are ignored until a later bit in the bitmap, which allocates them. In the example of FIG. 6, it is the final bit in the bitmap which allocates both resource blocks numbered 24.

Figure 7:
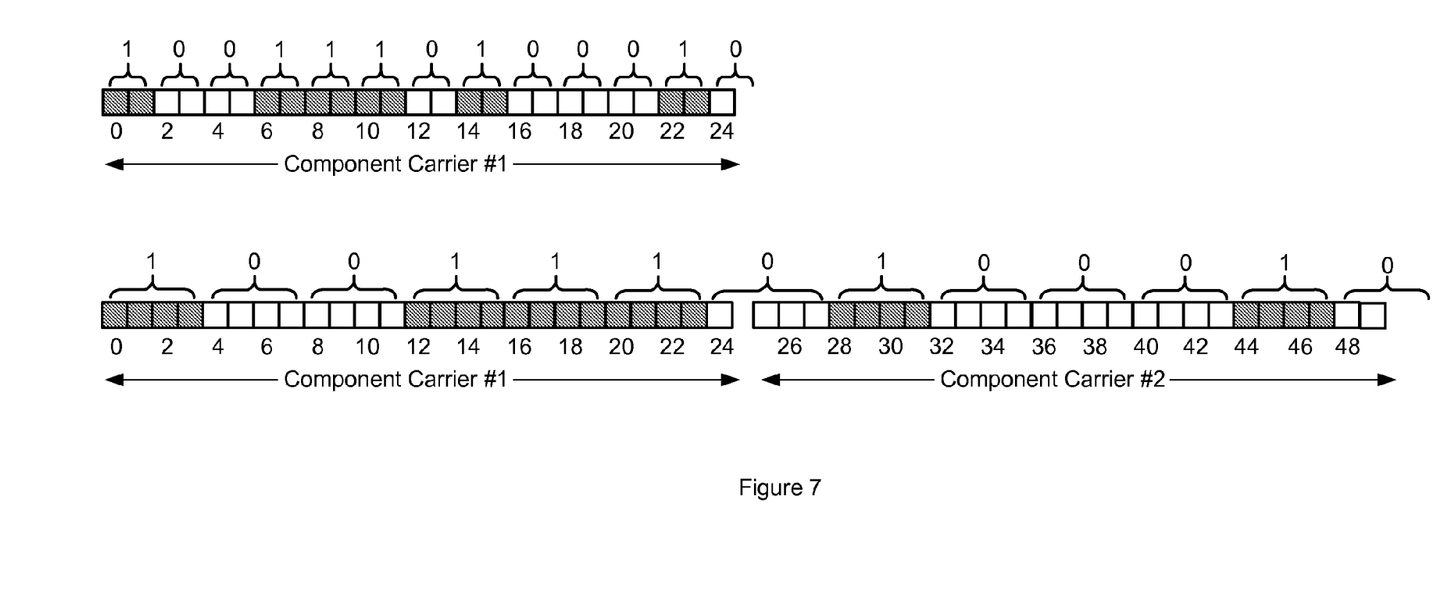
FIG. 7 is a diagram showing allocated resource blocks according to another embodiment of the present invention.

FIG. 7 is a diagram showing the allocation of resource blocks according to another embodiment of the present invention. The example shown is similar to that described with respect to FIG. 6, and so will not be described in great detail. The difference is that the resource blocks of the plurality of component carriers are numbered sequentially, and the numbering does not restart with each component carrier. In this embodiment, bits of the resource allocation message point to consecutive resource blocks, and run on to consecutive component carriers without gaps in the allocation of resource blocks.

Figure 8:
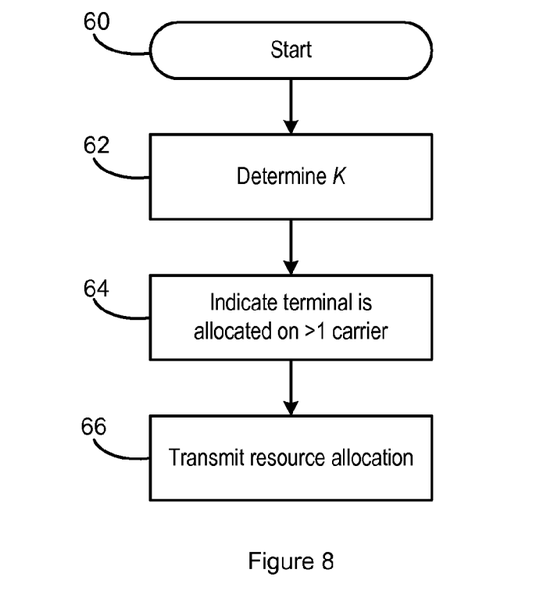
FIG. 8 shows a method in a radio base station according to the present invention.

FIG. 8 is a flow chart illustrating a method according to the present invention.

The method starts in step 60. In step 62, K is determined as described above.

The above description for extending the addressing range of the control signalling assumes that the mobile terminal is being allocated resources on multiple component carriers. If the terminal is only to be allocated resource blocks on one of the component carriers, the same interpretation of the control signalling as in Rel-8 can be assumed. Therefore, in step 64, the radio base station indicates to the terminal that it is allocated on a plurality of component carriers. Various methods will be apparent to those skilled in the art to send such an indication. One method is to assign the terminal multiple identities (note that the identity is implicitly included in the control signalling), one per component-carrier combination. Thus, when the mobile terminal receives its identity it can determine whether it is allocated resource blocks on more than one component carrier, and on which component carrier(s) it is allocated.

In step 66, a resource allocation message is transmitted according to the present invention.

The resource allocation message may be of a resource-allocation type 0, 1, or 2, as described above. In resource-allocation type 0, the message comprises a type identifier (i.e. identifying type 0) and a bitmap, where each bit of the bitmap points to a plurality of resource blocks. The number of resource blocks pointed to is determined as described above, through the use of the parameter K.

In resource-allocation type 1, the message comprises a type identifier (i.e. identifying type 1), one or more subset identifiers as described above, and a bitmap, where each bit of the bitmap points to a plurality of resource blocks. The number of resource blocks pointed to is determined as described above, through the use of the parameter K.

In resource-allocation type 2, the message comprises a starting resource block, and a length identifying the number of resource blocks allocated after the starting resource block. According to the present invention, the starting resource block and the length are both determined using K. For example, where the starting resource block is 10, the length equal to 50, and K equal to 5, the resource allocation message indicates a starting resource block of 2 and a length of 10.

The resource blocks may be numbered and allocated in any of a number of ways. For example, each bit in the resource allocation message may point to a plurality of resource blocks on the same component carrier, or to a combination of resource blocks on various component carriers (e.g. one resource block on each component carrier).

As stated previously, it is useful to be able to allocate single resource blocks on a component carrier. However, the reduced resolution offered by the present invention is not a significant drawback, as it is foreseen that multiple component carriers will be allocated only when large volumes of data are required to be transmitted. In this instance, the coarser granularity of the allocation is not important as large numbers of resource blocks will be allocated in any case. Moreover this allows resources on multiple carriers to be allocated by a single resource allocation message, and with the same format as legacy standards.

Figure 9:
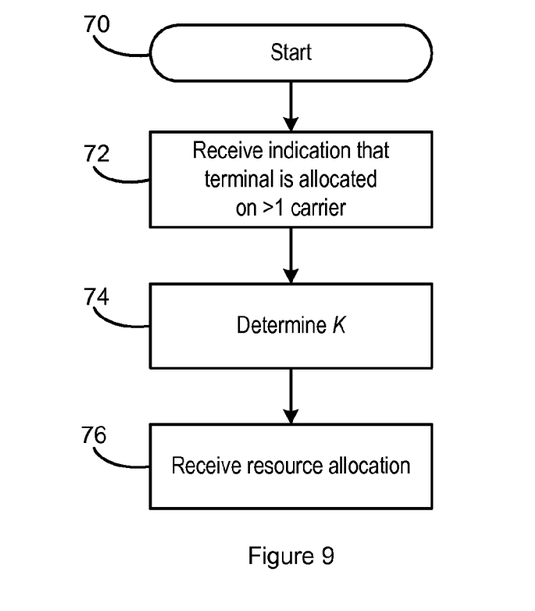
FIG. 9 shows a method in a mobile terminal according to the present invention.

FIG. 9 is a flowchart showing a corresponding method in a mobile terminal according to the present invention.

The method starts in step 70. In step 72, an indication is received that the mobile terminal is allocated resources on a plurality of component carriers. As before, various methods will be apparent to those skilled in the art to receive such an indication. One method is to assign the terminal multiple identities (note that the identity is implicitly included in the control signalling), one per component-carrier combination. Thus, when the mobile terminal receives its identity it can determine whether it is allocated resource blocks on more than one component carrier, and on which component carrier(s) it is allocated.

In step 74, the mobile terminal determines K as defined above, and according to the indication received in step 72.

In step 76, a resource allocation message according to the present invention is received. The processing circuitry of the mobile terminal may then interpret the one or more bits of the resource allocation message in the light of its determination of K in step 74.

The present invention therefore provides a solution to the problem of resource allocation in telecommunication systems where communications between a radio base station and a mobile terminal take place over more than one carrier. Resource allocation messages according to the present invention have the same format as legacy resource allocation messages, and therefore are compatible with legacy systems.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

What is claimed is:

1. A method in a radio base station for use in a telecommunications network, the radio base station being configured to transmit data to a mobile terminal of the telecommunications network over a plurality of carriers, resources on each of the plurality of carriers comprising respective pluralities of resource blocks, the method comprising transmitting to the mobile terminal a resource allocation message over a particular one of said carriers, the resource allocation message comprising an indication of a number of allocated resource blocks, wherein the number is a function of the ratio of the aggregate bandwidth of the plurality of carriers divided by the bandwidth of the carrier over which the resource allocation message is sent.

2. The method as claimed in claim 1, wherein the resource allocation message over a particular one of said carriers comprises one or more bits, each bit corresponding to a number of resource blocks.

3. The method as claimed in claim 2, wherein the resource allocation message comprises:
   a resource allocation type; and
   a bitmap comprising said one or more bits.

4. The method as claimed in claim 3, the resource allocation message further comprising:
   a resource block subset identifier.

5. The method as claimed in claim 1, wherein the number is equal to an integer multiple of the ratio.

6. The method as claimed in claim 1, wherein the number is equal to a non-unity integer multiple of the ratio.

7. The method as claimed in claim 1, wherein the ratio is rounded to an integer value.

8. The method as claimed in claim 1, wherein the number indicated in the resource allocation message is equal to an actual number of allocated resource blocks divided by the ratio.

9. The method as claimed in claim 8, wherein the resource allocation message further comprises an indication of a starting resource block of the allocated resource blocks, wherein the starting resource block indicated in the resource allocation message is equal to an actual starting resource block number divided by the ratio.

10. A radio base station for use in a telecommunications network, the radio base station being configured to transmit data to a mobile terminal of the telecommunications network over a plurality of carriers, resources on each of the plurality of carriers comprising respective pluralities of resource blocks, the radio base station comprising:
    a transmitter configured to transmit a resource allocation message over one carrier of the plurality of carriers; and
    processing circuitry configured to generate said resource allocation message to comprise an indication of a number of allocated resource blocks, wherein the number is a function of the ratio of the aggregate bandwidth of the plurality of carriers divided by the bandwidth of the carrier over which the resource allocation message is sent.

11. The radio base station as claimed in claim 10, wherein said processing circuitry is configured to generate the resource allocation message to comprise one or more bits, each bit corresponding to a number of resource blocks.

12. The radio base station as claimed in claim 11, wherein the resource allocation message comprises:
    a resource allocation type; and
    a bitmap comprising said one or more bits.

13. The radio base station as claimed in claim 12, the resource allocation message further comprising:
    a resource block subset identifier.

14. The radio base station as claimed in claim 10, wherein the number is equal to an actual number of allocated resource blocks divided by the ratio.

15. The radio base station as claimed in claim 10, wherein the resource allocation message further comprises an indication of a starting resource block of the allocated resource blocks, wherein the starting resource block indicated in the resource allocation message is equal to an actual starting resource block number divided by the ratio.

16. A mobile terminal for use in a telecommunications network, the mobile terminal being configured to receive data from a radio base station of the telecommunications network over a plurality of carriers, resources on each of the plurality of carriers comprising respective pluralities of resource blocks, the mobile terminal comprising:
    a receiver configured to receive a resource allocation message over one carrier of the plurality of carriers, said resource allocation message comprising an indication of a number of allocated resource blocks; and
    processing circuitry configured to decode said resource allocation message to determine said number of allocated resource blocks from a function of the ratio of the aggregate bandwidth of the plurality of carriers divided by the bandwidth of the carrier over which the resource allocation message is sent.

17. The mobile terminal as claimed in claim 16, wherein said resource allocation message comprises one or more bits, each bit corresponding to a number of resource blocks.

18. The mobile terminal as claimed in claim 17, wherein the resource allocation message comprises:
    a resource allocation type; and
    a bitmap comprising said one or more bits.

19. The mobile terminal as claimed in claim 18, the resource allocation message further comprising:
    a resource block subset identifier.

20. The mobile terminal as claimed in claim 16, wherein the number of allocated resource blocks indicated in the resource allocation message is equal to an actual number of allocated resource blocks divided by the ratio.

21. A method in a mobile terminal for use in a telecommunications network, the mobile terminal being configured to receive data from a radio base station of the telecommunications network over a plurality of carriers, resources on each of the plurality of carriers comprising respective pluralities of resource blocks, the method comprising:
    receiving from the radio base station a resource allocation message over a particular one of said carriers, the resource allocation message comprising an indication of a number of allocated resource blocks; and
    determining the number of allocated resource blocks from a function of the ratio of the aggregate bandwidth of the plurality of carriers divided by the bandwidth of the carrier over which the resource allocation message is sent.

22. The method as claimed in claim 21, whereby the resource allocation message comprises one or more bits, each bit corresponding to a number of resource blocks.

23. The method as claimed in claim 22, wherein the resource allocation message comprises:
    a resource allocation type; and
    a bitmap comprising said one or more bits.

24. The method as claimed in claim 23, the resource allocation message further comprising:
    a resource block subset identifier.

25. The method as claimed in claim 21, wherein the number is equal to an integer multiple of the ratio.

26. The method as claimed in claim 21, wherein the number is equal to a non-unity integer multiple of the ratio.

27. The method as claimed in claim 21, wherein the ratio is rounded to an integer value.

28. The method as claimed in claim 21, wherein the number is equal to an actual number of allocated resource blocks divided by the ratio.

* * * * *